(12) United States Patent
Umemoto

(10) Patent No.: US 6,690,269 B2
(45) Date of Patent: Feb. 10, 2004

(54) CONTROL UNIT FOR INTERNAL COMBUSTION ENGINE

(75) Inventor: Hideki Umemoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/996,791

(22) Filed: Nov. 30, 2001

(65) Prior Publication Data

US 2002/0186126 A1 Dec. 12, 2002

(30) Foreign Application Priority Data

Jun. 7, 2001 (JP) ........................................ 2001-172703

(51) Int. Cl.⁷ .............................................. B60Q 1/00
(52) U.S. Cl. ........................ 340/438; 340/439; 340/459; 340/635; 340/825.5
(58) Field of Search ................................ 340/438, 439, 340/459, 635, 825.5; 364/186, 184

(56) References Cited

U.S. PATENT DOCUMENTS

| 4,835,671 | A | | 5/1989 | Sato et al. | |
|---|---|---|---|---|---|
| 4,949,083 | A | | 8/1990 | Hirabayashi et al. | |
| 5,019,799 | A | * | 5/1991 | Oshiage et al. | 340/438 |
| 5,176,027 | A | * | 1/1993 | Umemoto | 73/118.1 |
| 5,461,569 | A | * | 10/1995 | Hara et al. | 340/438 |
| 5,506,773 | A | * | 4/1996 | Takaba et al. | 340/438 |
| 5,590,040 | A | * | 12/1996 | Abe et al. | 340/438 |

FOREIGN PATENT DOCUMENTS

| JP | 3-210052 | 9/1991 | ........... F02D/45/00 |
|---|---|---|---|
| JP | 3-210715 | 9/1991 | ............ H01H/9/54 |

* cited by examiner

Primary Examiner—Daniel J. Wu
Assistant Examiner—Hung Nguyen
(74) Attorney, Agent, or Firm—Sughrue Mion, PLLC

(57) ABSTRACT

A control unit for an internal combustion engine is provided in which the number of input and output terminals can be reduced while maintaining the function of detecting an abnormality of an existing internal combustion engine and generating a warning based thereon, as a consequence of which the size and weight of the control unit is reduced. The control unit includes: an input and output I/F circuit 67 connected through a common signal line with an abnormality detection device, which generates an abnormality detection signal when an abnormality of the internal combustion engine is detected, and with at least one warning device, which generates a warning based on the abnormality detected, the input and output I/F circuit being adapted to receive an abnormality detection signal from the abnormality detection device and output a drive and hold signal to the warning device; and an arithmetic processing section 50 for controlling the abnormality detection device and the warning device through the input and output I/F circuit in such a manner that a drive and hold signal is output to the warning device when the abnormality detection signal is input to the arithmetic processing section.

5 Claims, 5 Drawing Sheets

CONTROL UNIT FOR INTERNAL COMBUSTION ENGINE

This application is based on Application No. 2001-172703, filed in Japan on Jun. 7, 2001, the contents of which are hereby incorporated by reference.

BACKGROUND OF THE INVENTION

1. Field of the Invention

The present invention relates to a control unit for an internal combustion engine, and in particular to the detection of abnormality in an internal combustion engine and the generation of warnings based on the abnormality detected.

2. Description of the Related Art

FIG. 4 is a schematic constructional view illustrating those portions of such a kind of known control unit for an internal combustion engine which relate particularly to the detection of abnormality and the generation of warnings based on the abnormality detected. In this figure, the control unit for an internal combustion engine (hereinafter abbreviated as ECU), generally designated at a reference numeral 1, is connected with abnormality detection devices 2 (though only one is illustrated) such as a variety of kinds of sensors, switches and so on, for example, for controlling the internal combustion engine (hereinafter simply referred to as an engine), and with warning devices such as a lamp 3 and a buzzer 4 for informing a user (driver, passengers, etc.) of the occurrence of abnormality based on the detection thereof.

The ECU 1 includes a control CPU 5, input interface ("I/F") circuits 6 provided one for each of the abnormality detection devices 2, output I/F circuits 7a, 7b provided one for each of the warning devices comprising the lamp 3, the buzzer 4, etc, an input side connector 1a having a plurality of input terminals 2p provided one for each of the abnormality detection devices 2, and an output side connector 1b having a plurality of output terminals 3p, 4p provided one for each of the warning devices 3, 4.

FIG. 5 particularly illustrates the circuit structure of one input I/F circuit 6 and one set of output I/F circuits 7a, 7b of the known control unit for an internal combustion engine of FIG. 4. The input I/F circuit 6 includes a transistor Tr1, pull-up resistors R1, R2, a diode D1 for protection from an external negative surge voltage, and a combination of a capacitor C1 and a resistor R3 together constituting an RC filter for preventing chattering by smoothing an input signal to the transistor Tr1.

The output I/F circuits 7a and 7b include transistors Tr1a, Tr1b, pull-up resistors R11a, R11b, resistors R12a, R12b connected with the base sides of the transistors Tr11a, Tr11b, respectively, and resistors R13a, R13b connected with the collector sides of the transistors Tr11a, Tr11b, respectively.

Now, the operation of the circuit of FIG. 5 will be described briefly. When abnormality is detected by an abnormality detection device 2, this abnormality detection device 2 shown as a switch in FIG. 5 is closed, whereby the transistor Tr1 of the input I/F circuit 6 is placed into an off state, permitting a high (H) level signal representative of the detection of abnormality to be input to the CPU 5. As a result, the CPU 5 outputs H level signals to the output I/F circuits 7a, 7b, respectively. That is, current is supplied from a power supply Vcc to the transistors Tr11a, Tr11b, which are thereby turned on, driving the respective warning devices such as the lamp 3 and the buzzer 4 to generate warnings of light and sound.

In the past, the control unit for an internal combustion engine, i.e., ECU 1, performs various control operations (e.g., ignition timing control, fuel injection control, etc.) for the internal combustion engine, and at the same time detects various abnormality states of the engine thereby to generate warnings to the user (in general, the driver).

To this end, there are provided the abnormality detection devices 2 such as, for example, various sensors, switches and the like, and the warning devices such as the warning lamps 3, the warning buzzers 4 and the like. Connected with the ECU 1 are abnormality detection devices 2 and the warning devices 3, 4 for detecting and warning of the above-mentioned abnormal states, so that the detection of abnormal states and the generation of warnings are controlled by means of the CPU 5 incorporated in the ECU 1.

Here, it is to be noted that the input I/F circuits 6 and the input terminals 2p equal in number to the abnormality detection devices 2 are required though only one for each of them is illustrated in FIGS. 4 and 5 for the sake of concise explanation. Also, the output I/F circuits 7a, 7b and the output terminals 3p, 4p equal in number to the corresponding warning devices 3, 4, are required though only two of them are illustrated in FIGS. 4 and 5 for the sake of concise explanation.

In this manner, one or more warning devices is generally provided for one abnormality detection device in this kind of known control unit for an internal combustion engine, and hence two or more input terminals and output terminals of the control unit for an internal combustion engine are necessary.

At present, the number of kinds of warning control operations to be performed in the control unit for an internal combustion engine, i.e., the ECU, tends to increase, and hence the number of input and output terminals accordingly increases, too. As the number of the input and output terminals increases, the number of terminals of the connectors to be used accordingly increases, too. In addition, the size of the connectors also increases, thus resulting in an increase in size of the ECU.

In these circumstances, connector manufactures are now in the process of developing connectors with many terminals in order to cope with the increasing number of the input and output terminals. However, there is a tendency that the connectors newly developed in this manner become greater in size than the existing ones.

On the other hand, the configuration of the engine surroundings are also becoming more and more complicated in accordance with the increasing power, environmental response, etc., of an engine. As a consequence, miniaturization and weight reduction of the ECU come to be important problems.

SUMMARY OF THE INVENTION

The present invention is intended to obviate the problems as referred to above and has for its object to provide a control unit for an internal combustion engine in which the number of input and output terminals can be reduced for miniaturization and weight reduction thereof while maintaining the function of detecting an abnormality of an existing internal combustion engine and generating a warning based thereon.

Bearing the above object in mind, the present invention resides in a control unit for an internal combustion engine comprising: an input and output I/F circuit connected through a common signal line with an abnormality detection device, which generates an abnormality detection signal when an abnormality of the internal combustion engine is detected, and with at least one warning device, which generates a warning based on the abnormality detected, the input and output I/F circuit being adapted to receive an abnormality detection signal from the abnormality detection device and output a drive and hold signal to the warning device; and an arithmetic processing section for controlling the abnormality detection device and the warning device through the input and output I/F circuit in such a manner that a drive and hold signal is output to the warning device when the abnormality detection signal is input to the arithmetic processing section.

In a preferred form of the present invention, the control unit is provided with one input and output terminal for the one common signal line.

In another preferred form of the present invention, the arithmetic processing section disregards an abnormality detection signal from the abnormality detection device during the period in which a drive and hold signal is output to the warning device.

In a further preferred form of the present invention, the arithmetic processing section generates a drive and hold signal to the warning device for a predetermined period while disregarding the abnormality detection signal for the predetermined period when the abnormality detection signal is detected through the input and output I/F circuit, and the arithmetic processing section begins to detect the abnormality detection signal again after the lapse of the predetermined period.

In the present invention, an abnormality detection devices and warning devices responding to the abnormality detection device are commonly connected in parallel with one input and output terminal of a control unit for an internal combustion engine. The input and output terminal has an I/F circuit which is constituted by an input and output I/F circuit in which an input I/F circuit having the function of detecting an input from the abnormality detection device and an output I/F circuit having the function of driving and holding the warning devices are arranged in parallel with respect to each other. These input I/F circuit and output I/F circuit are connected with an input terminal and an output terminal of a CPU, which acts as an arithmetic processing section, so that the CPU carries out control on warning generation.

As a result, it can be constructed such that the control unit for an internal combustion engine uses a reduced number of input and output terminals while having the same warning generation function as an existing one. Thus, it becomes possible to reduce the number of terminals (e.g., the number of pins) of connectors to be used and at the same time achieve reduction in size and weight of the control unit for an internal combustion engine.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Now, a preferred embodiment of the present invention will be described in detail while referring to the accompanying drawings.

Embodiment 1

Figure 1:
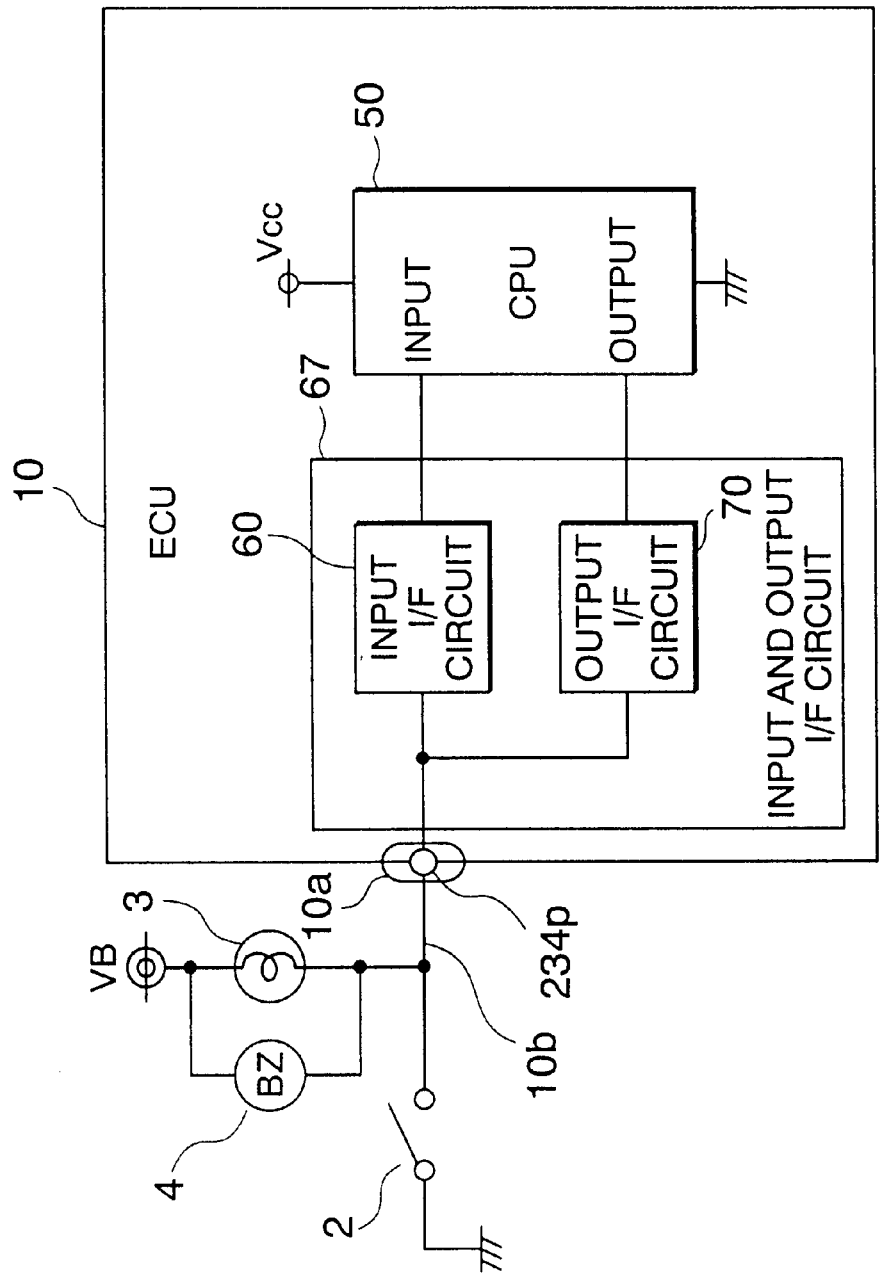
FIG. 1 is a schematic constructional view illustrating those portions of a control unit for an internal combustion engine according to one embodiment of the present invention which relate particularly to the detection of abnormality and the generation of warnings based on the abnormality detected.

FIG. 1 schematically illustrates those portions of a control unit for an internal combustion engine according to one embodiment of the present invention which relate particularly to the detection of abnormality and the generation of warnings based on the abnormality detected. In this figure, the same or corresponding parts as those of the above-mentioned known control unit for an internal combustion engine are identified by the same symbols. The control unit for an internal combustion engine (ECU), generally designated at a reference numeral 10, is connected with abnormality detection devices 2 (only one is illustrated) such as, for example, sensors, switches, etc., for controlling the internal combustion engine (engine), and warning devices comprising a lamp 3 and a buzzer 4 for informing the user (driver, passengers, etc.) of the abnormality based on the occurrence of abnormality detected.

The ECU 10 includes a control CPU 50 which constitutes an arithmetic processing section, and a plurality of input and output I/F circuits 67 (though only one is illustrated in FIG. 1) provided one for each set of an abnormality detection device 2 and warning devices 3, 4 responding thereto. Each input and output I/F circuit 67 is constituted by an input I/F circuit 60 having the function of detecting an input from a corresponding abnormality detection device 2, and an output I/F circuit 70 arranged in parallel with the input I/F circuit 60 and having the function of driving and holding corresponding warning devices 3, 4. These input I/F circuit 60 and the output I/F circuit 70 are connected at one ends thereof with an input terminal and an output terminal, respectively, of the CPU 50, and at the other ends thereof with an input and output connector 10a to be described later in detail. The CPU 50 serves to detect abnormality and control the generation of warnings based thereon.

The input and output connector 10a has a plurality of input and output terminals 234p provided one for each set of an abnormality detection device 2 and corresponding warning devices 3, 4 responding thereto. Each abnormality detection device 2 and the corresponding warning devices 3, 4 responding thereto are commonly connected with the corresponding input and output terminal 234p through a common signal line or wire 10b.

Figure 2:
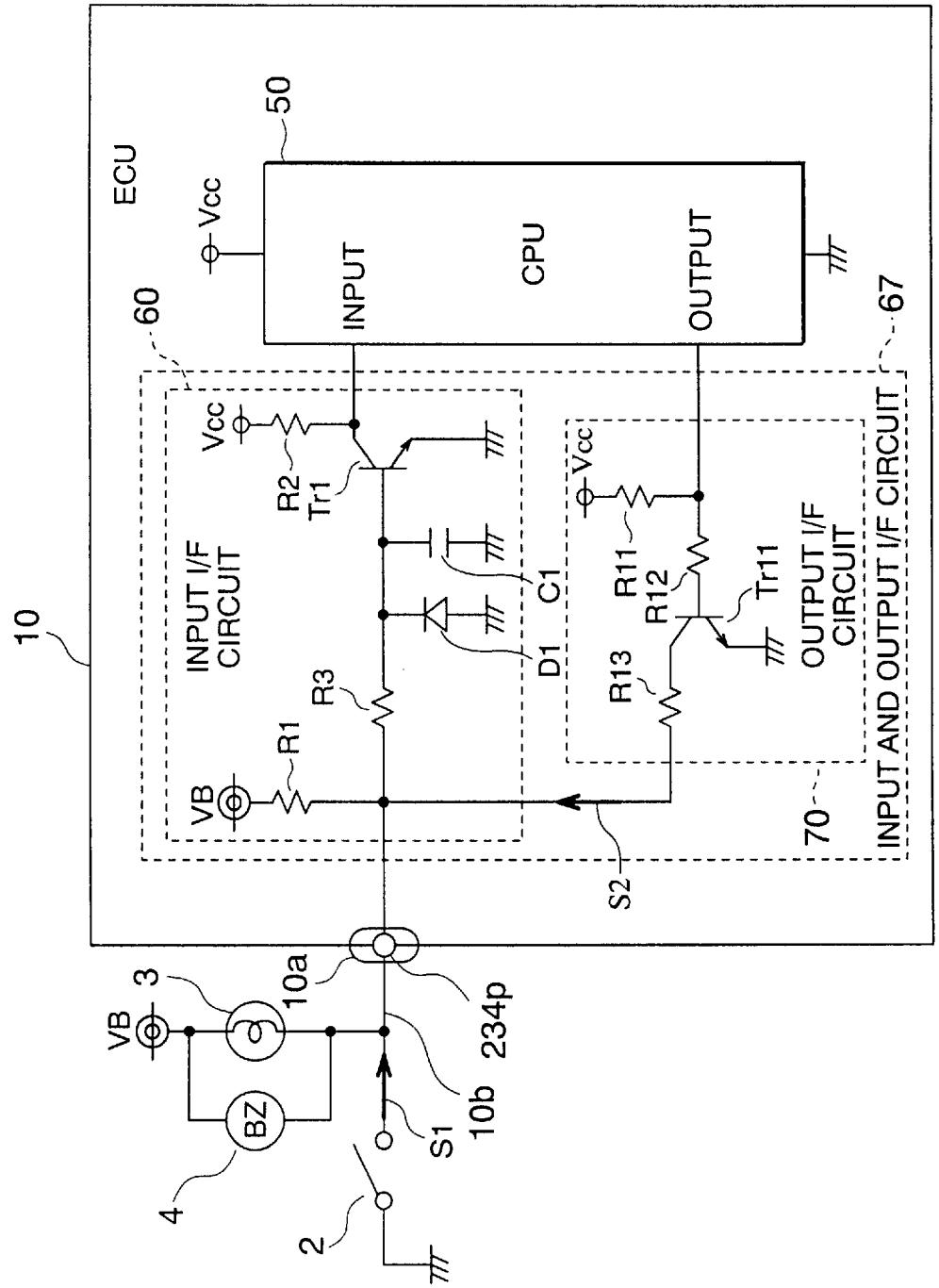
FIG. 2 is a view particularly illustrating one example of the circuit structure of an input and output I/F circuit in the control unit for an internal combustion engine of FIG. 1.

FIG. 2 particularly illustrates one example of the circuit structure of an input and output I/F circuit 67 of the control unit for an internal combustion engine of FIG. 1 according to one embodiment of the present invention. The input I/F circuit 60 of each output I/F circuit 67 includes a transistor Tr1, pull-up resistors R1, R2, a diode D1 for protection from an external negative surge voltage, and a combination of a capacitor C1 and a resistor R3 which together constitute an RC filter for preventing chattering by smoothing an input signal to the transistor Tr1.

Also, the output I/F circuit 70 of each output I/F circuit 67 includes a transistor Tr11, a pull-up resistor R11, a resistor R12 connected with the base side of the transistor Tr11, and a resistor R13 connected with the collector side of the transistor Tr11. Here, note that a symbol S1 designates an abnormality detection signal, and a symbol S2 designates a drive and hold signal for the warning devices 3, 4. In addition, a symbol Vcc designates a drive voltage for the CPU 50, and a symbol VB designates the voltage of a battery (not shown) which supplies power to the abnormality detection devices 2, the warning devices 3, 4, the ECU 10 and so on.

Next, the operation of the circuit of FIG. 2 will be briefly described below. When abnormality is detected by an abnormality detection device 2, this abnormality detection device 2, which is shown as a switch, is closed so that a low (L) level abnormality detection signal S1 is supplied to the transistor Tr1 of the corresponding input I/F circuit 60 through the common signal line 10b, thus turning off the transistor Tr1. As a result, a high (H) level signal representative of the detection of abnormality is input to the CPU 50, which then outputs an H level signal to the corresponding output I/F circuit 70 (that is, the current from the power supply Vcc is supplied to the output I/F circuit 70), thereby turning on the transistor Tr11. As a consequence, the respective warning devices such as the lamp 3 and the buzzer 4 are driven to operate, and an L level drive and hold signal S2 for holding this driving state (i.e., for drawing current into the grounded side of the transistor Tr11) is output from the output I/F circuit 70 to the warning devices, so that warnings in the form of light and sound are generated by the warning devices with this state being held until the signal supplied from the CPU 50 to the output I/F circuit 70 is changed from the H level to the L level.

The input to the input I/F circuit 60 is held at the L level similar to the abnormality detection signal S1 for the period when the warning devices 3, 4 are driven by the CPU 50 for example (i.e., the lamp and the buzzer are in the on state). Therefore, the CPU 50 operates to disregard the detection result of the input I/F circuit 60, i.e., the detection of an abnormality detection signal. Specifically, only during the period in which there is no drive and hold signal S2 output from the CPU 50 to the warning devices 3, 4, the CPU 50 detects and confirms an abnormality detection signal S1 input to the input I/F circuit 60, thus performing warning control.

Figure 3:
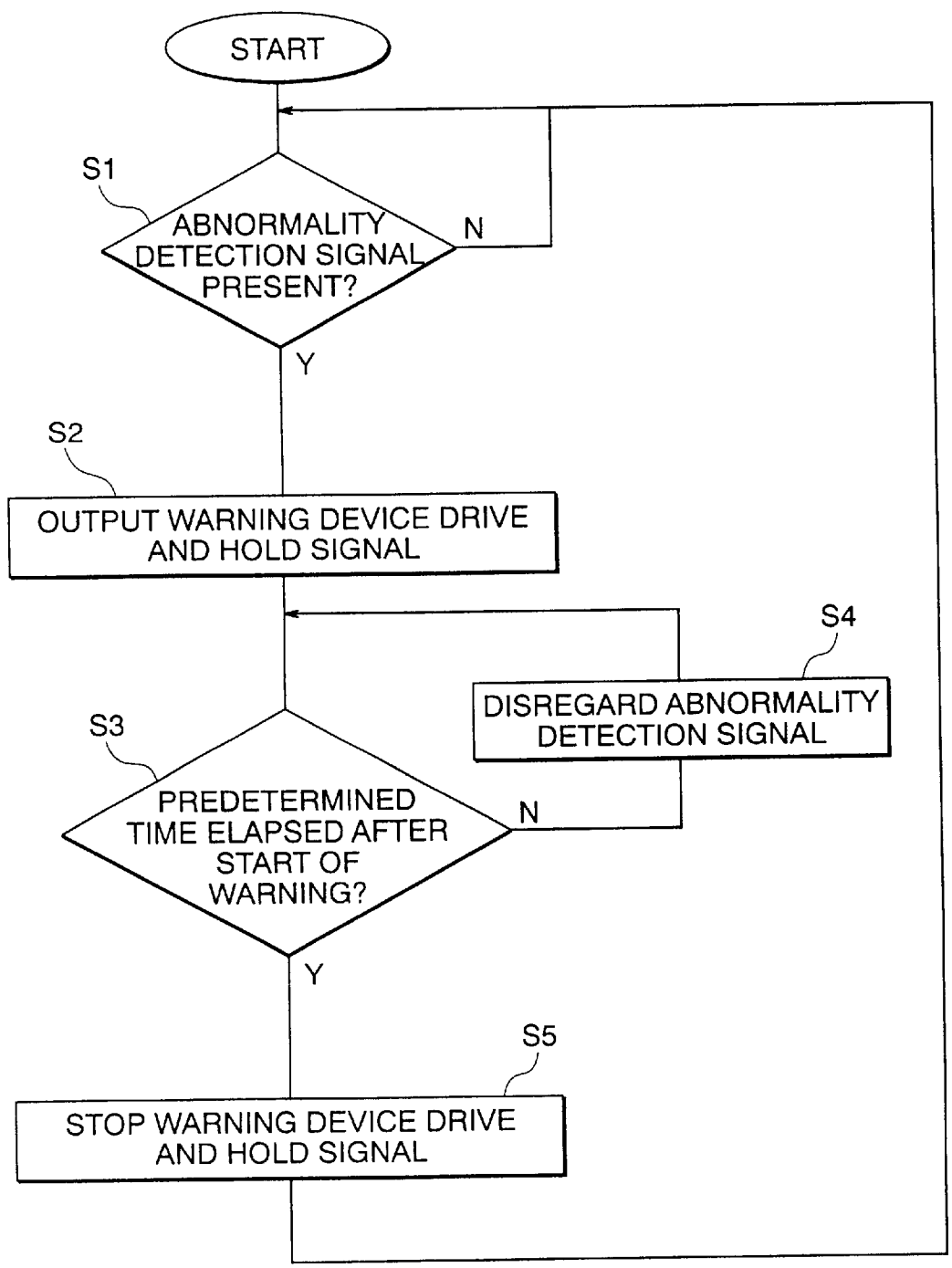
FIG. 3 is a flow chart illustrating an exemplary operation of a CPU in the control unit for an internal combustion engine of FIG. 1.
Figure 4:
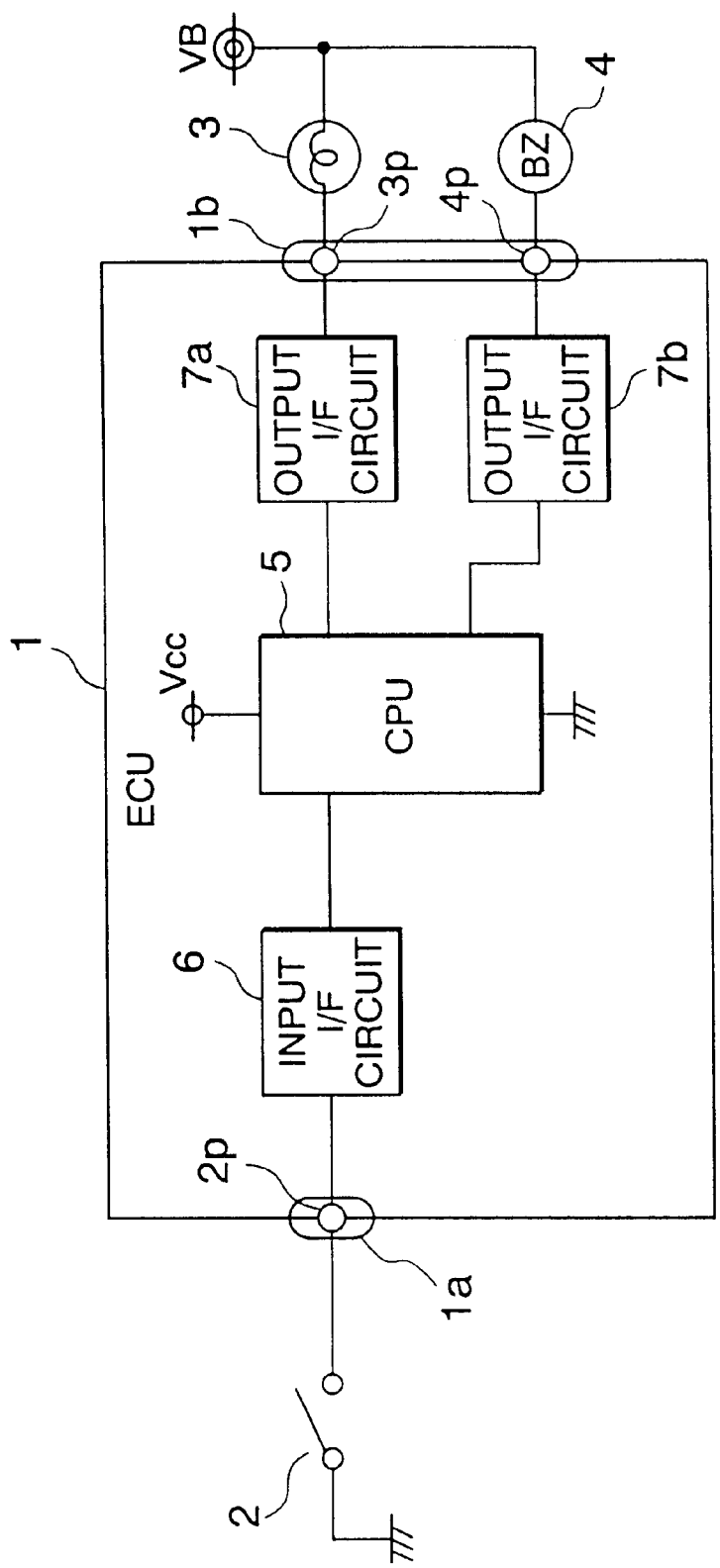
FIG. 4 is a schematic constructional view illustrating those portions of this kind of known control unit for an internal combustion engine which relate particularly to the detection of abnormality and the generation of warnings based on the abnormality detected.
Figure 5:
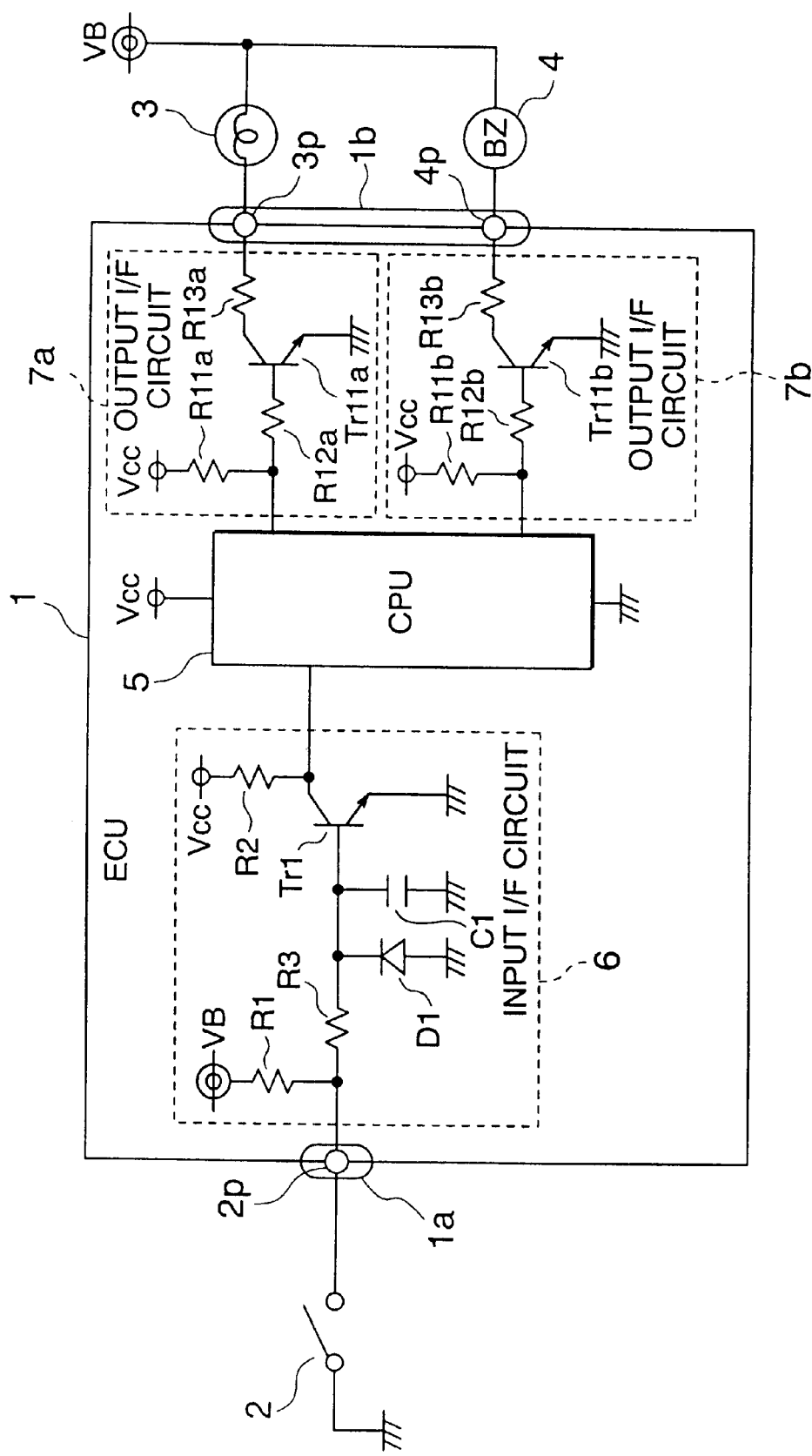
FIG. 5 is a view particularly illustrating the circuit structure of an input I/F circuit and an output I/F circuit of the known control unit for an internal combustion engine of FIG. 4.

One example of the operation of the CPU 50 in such control is illustrated in a flow chart of FIG. 3. When the CPU 50 detects an abnormality detection signal based on an input from an input I/F circuit 60 (step S1), it outputs a signal for generating a warning device drive and hold signal to the corresponding output I/F circuit 70 (step S2). This continues for a predetermined period (step S3). The abnormality detection signal, i.e., the input from the input I/F circuit 60 is disregarded for the period in which the warning device drive and hold signal is being output. After the lapse of a predetermined period, the CPU 50 outputs a signal for stopping the warning device drive and hold signal to the output I/F circuit 70 (step S5), and it begins to detect an abnormality detection signal again based on an input from the input I/F circuit 60 (step S1).

With such a configuration, it becomes possible to accurately perform the detection of an occurrence of abnormality and the generation of warnings based thereon at one input and output terminal of the ECU or the control unit for an internal combustion engine. At the same time, it is also possible to reduce the number of terminals as required of the ECU (i.e., from two or more terminal to one terminal), as a result of which it becomes possible to adapt the control unit for an internal combustion engine to the miniaturization and the weight reduction thereof.

As described in the foregoing, according to the present invention, a control unit for an internal combustion engine includes: an input and output I/F circuit connected through a common signal line with an abnormality detection device, which generates an abnormality detection signal when an abnormality of the internal combustion engine is detected, and with at least one warning device, which generates a warning based on the abnormality detected, the input and output I/F circuit being adapted to receive an abnormality detection signal from the abnormality detection device and output a drive and hold signal to the warning device; and an arithmetic processing section for controlling the abnormality detection device and the warning device through the input and output I/F circuit in such a manner that a drive and hold signal is output to the warning device when the abnormality detection signal is input to the arithmetic processing section. With this arrangement, the number of input and output terminals can be reduced while maintaining the function of detecting an abnormality of an existing internal combustion engine and generating a warning based thereon, as a consequence of which it is possible to reduce the size and weight of the control unit for an internal combustion engine.

Moreover, the control unit is provided with one input and output terminal for the one common signal line. Thus, the number of input and output terminals are reduced, and hence the size of the connector for these terminals can be reduced.

In addition, the arithmetic processing section disregards an abnormality detection signal from the abnormality detection device during the period in which a drive and hold signal is output to the warning device, whereby the control load in the arithmetic processing section can be reduced.

Further, the arithmetic processing section generates a drive and hold signal to the warning device for a predetermined period while disregarding the abnormality detection signal for the predetermined period when the abnormality detection signal is detected through the input and output I/F circuit, and the arithmetic processing section begins to detect the abnormality detection signal again after the lapse of the predetermined period. With this arrangement, it is possible to reduce the control load in the arithmetic processing section.

While the invention has been described in terms of a preferred embodiment, those skilled in the art will recognize that the invention can be practiced with modifications within the spirit and scope of the appended claims.

What is claimed is:

1. A control unit for an internal combustion engine comprising:
an input and output interface circuit connected through a common signal line with an abnormality detection device, which generates an abnormality detection signal when an abnormality of said internal combustion engine is detected, and
with at least one warning device, which generates a warning based on the abnormality detected,
said input and output interface circuit being adapted to receive an abnormality detection signal from said abnormality detection device and output a drive and hold signal to said warning device; and an arithmetic processing section for controlling said abnormality detection device and said warning device through said input and output interface circuit in such a manner that a drive and hold signal is output to said warning device when said abnormality detection signal is input to said arithmetic processing section, wherein said arithmetic processing section generates a drive and hold signal to said warning device for a predetermined period while disregarding the abnormality detection signal for said predetermined period when said abnormality detection signal is detected through said input and output interface circuit, and said arithmetic processing section begins to detect said abnormality detection signal again after the lapse of said predetermined period.

2. The control unit for an internal combustion engine according to claim 1, wherein said control unit is provided with one input and output terminal for said one common signal line.

3. The control unit for an internal combustion engine according to claim 2, wherein said arithmetic processing section disregards an abnormality detection signal from said abnormality detection device during the period in which a drive and hold signal is output to said warning device.

4. The control unit for an internal combustion engine according to claim 3, wherein said arithmetic processing section generates a drive and hold signal to said warning device for a predetermined period while disregarding the abnormality detection signal for said predetermined period when said abnormality detection signal is detected through said input and output interface circuit, and said arithmetic processing section begins to detect said abnormality detection signal again after the lapse of said predetermined period.

5. The control unit for an internal combustion engine according to claim 1, wherein said arithmetic processing section disregards an abnormality detection signal from said abnormality detection device during the period in which a drive and hold signal is output to said warning device.

* * * * *